(12) United States Patent
Lawrence (10) Patent No.: US 10,115,094 B2
(45) Date of Patent: Oct. 30, 2018

(54) VISUAL CUSTOMER IDENTIFICATION

(71) Applicant: NCR Corporation, Law Dept., Duluth, GA (US)

(72) Inventor: Jonathan Wesley Lawrence, Cumming, GA (US)

(73) Assignee: NCR Corporation, Atlanta, GA (US)

(*) Notice: Subject to any disclaimer, the term of this patent is extended or adjusted under 35 U.S.C. 154(b) by 506 days.

(21) Appl. No.: 14/136,640

(22) Filed: Dec. 20, 2013

(65) Prior Publication Data

US 2015/0178703 A1  Jun. 25, 2015

(51) Int. Cl.
*G06Q 20/20* (2012.01)
*G06Q 30/06* (2012.01)
*G06K 9/00* (2006.01)

(52) U.S. Cl.
CPC ......... *G06Q 20/20* (2013.01); *G06K 9/00221* (2013.01); *G06Q 20/209* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 3,705,677 A * | 12/1972 | Jones, Sr. ............... | B42F 5/00 242/615.3 |
| 8,498,899 B2 | 7/2013 | Martucci et al. | |
| 8,880,425 B2 | 11/2014 | Loevenguth et al. | |
| 2004/0024709 A1* | 2/2004 | Yu ......................... | G06Q 20/105 705/43 |
| 2010/0076854 A1* | 3/2010 | Martucci ............... | G06Q 20/202 705/15 |
| 2010/0153225 A1* | 6/2010 | Ferro .................. | B42D 15/0053 705/24 |
| 2011/0251906 A1* | 10/2011 | Loevenguth ........... | G06Q 20/10 705/16 |
| 2011/0307265 A1* | 12/2011 | Bannis ................... | G06Q 50/22 705/2 |
| 2013/0027561 A1 | 1/2013 | Lee et al. | |
| 2013/0124314 A1* | 5/2013 | Navar ................ | G06Q 30/0251 705/14.53 |

FOREIGN PATENT DOCUMENTS

| | | |
|---|---|---|
| EP | 2759973 A1 | 7/2014 |
| JP | 5314199 B | 10/2013 |

OTHER PUBLICATIONS

PayPal Launches New In-Store Payment Option in Australia, Nov. 14, 2012 (Nov. 14, 2012), XP055185527, Internet Retrieved from the Internet: URL:http://www.islandpacific.com/images/stories/docs/Case_Studies/paypal_pos_annoucement_final.pdf [retrieved on Apr. 23, 2015] * the whole document *.

* cited by examiner

*Primary Examiner* — Paul Danneman
(74) *Attorney, Agent, or Firm* — Schwegman, Lundberg & Woessner (57) ABSTRACT

An image of a customer is associated with a transaction at an enterprise. The image is accessible during enterprise transaction processing for visual inspection. In an embodiment, the image is printed as a receipt that is handled by enterprise personnel to visually ascertain a particular customer that is to receive at least one good and/or service associated with the transaction.

15 Claims, 4 Drawing Sheets

VISUAL CUSTOMER IDENTIFICATION

BACKGROUND

Enterprises have become hyper competitive with one another in the pursuit of customers and customer loyalty. Technological advancements have permitted enterprises to become even more creative in with their efforts to satisfy the customers.

Moreover, technology has also been integrated within enterprises to make the enterprises more operationally efficient and to reduce staffing needs and expenses of the enterprises.

For example, in the hospitality industry most businesses are regularly developing new ways for using technology: to engage their guests, to win over guests from existing competitors, and to improve the overall perceived guest experiences when the guests are interacting with establishments of the businesses.

Consider, a customer ordering at a fast-food establishment (deli, coffee shop, etc.) during a heavy traffic period, many customers can be waiting for the completion of their orders as orders come up.

Some businesses try to manage this situation by shouting out the order for the customer to identify. This approach is inefficient because a customer that is supposed to get the order may not be paying attention, may be acquiring condiments at a location away from the counter, may be visiting the restroom, may be on the phone, or may be distracted in some other manner. So, the workers may set the order aside and forget for some extended period of time to re-shout the order number out again. Most, likely a frustrated customer approaches the workers and asks where it is.

Other businesses will print an order number on a customer receipt that is given to the customer and then shout the order number out when the order is ready for pickup. This has problems as well because not all customers want receipts and some businesses are trying to get away from producing multiple different copies and versions of receipts (one for the workers, one for the customer). Further, this approach still suffers from the same setbacks detailed above when the order contents are shouted out by the workers. Perhaps, the only benefit of this approach is that the wrong customer is less likely to walk away with an order that was not his/hers because workers can match numbers on customer-retained receipts against receipts carried with the order (whereas this is not done with the first approach described above).

It is noted that both approaches, in the above-described examples, suffer from being impersonal. That is, the customer feels as if he/she is just a number or an order number where the business has no interest at all in who the customer actually is and his/value to the business.

SUMMARY

In various embodiments, methods and system for visual customer identification while at an enterprise are presented.

According to an embodiment, a method for visual customer identification is provided. Specifically, an image associated with a customer for processing a transaction of the customer is received. Next, the image is integrated for visual presentation during processing of the transaction.

DETAILED DESCRIPTION

Figure 1:
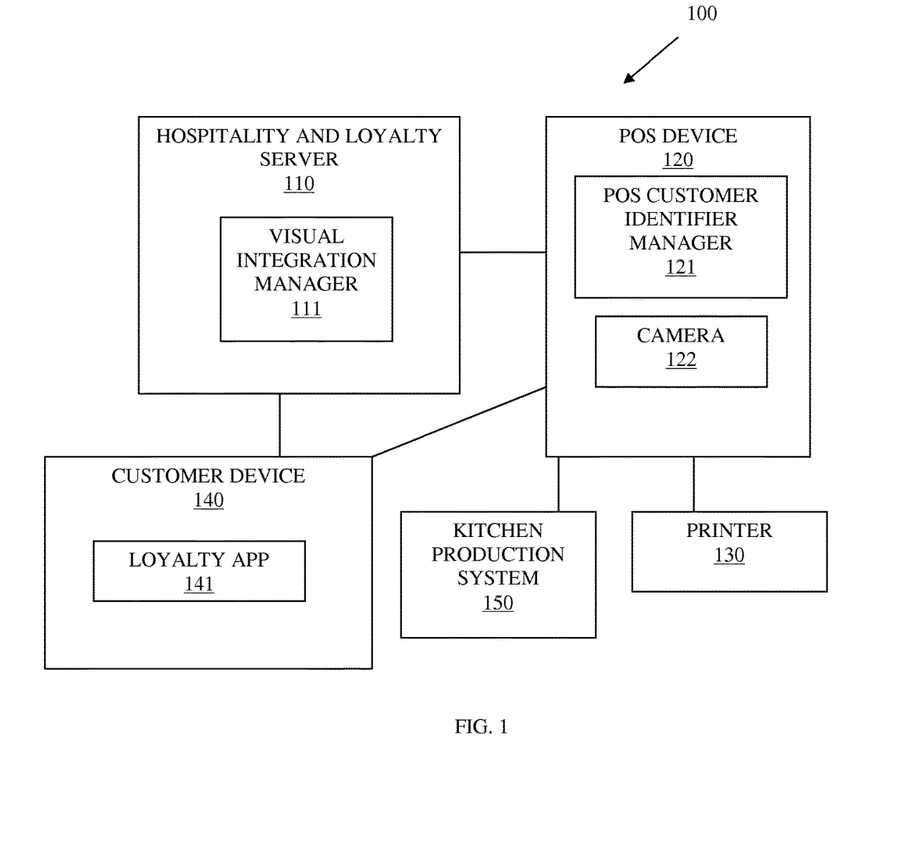
FIG. 1 is a diagram of an example architecture for practicing visual customer identification at an enterprise, according to an example embodiment.

FIG. 1 is a diagram of an example architecture 100 for practicing visual customer identification at an enterprise, according to an example embodiment. It is to be noted that the hospitality and loyalty server 110 is shown schematically in greatly simplified form, with only those components relevant to understanding of this embodiment being illustrated. The same situation is true for the Point-Of-Sale (POS) device 120, the printer 130, the customer device 140, and, optionally, the kitchen production system 150. The various components of the hospitality and loyalty server 110, the POS device 120, the printer 130, the customer device 140, and the kitchen production system 150, which are not depicted would be readily appreciated and understood by one of ordinary skill the art.

Furthermore, the various components (that are identified in the FIG. 1) are depicted and the arrangement of the components is presented for purposes of illustration only. It is to be noted that other arrangements with more or less components are possible without departing from the visual customer identification mechanisms presented herein and below.

The methods and system presented herein and below for visual customer identification can be implemented in whole or in part in one, all, or some combination of the components shown with the architecture 100. The methods and system are programmed as executable instructions in memory and/or non-transitory computer-readable storage media and executed on one or more processors associated with the components.

Specifically, the architecture 100 permits visual customer identification of a customer while at an enterprise facility utilizing a visual integration manager 111 (of the hospitality and loyalty server 100) to communicate an image of the customer to the POS customer identification manager 121 (of the POS device 120).

In an embodiment, the POS customer identification manager 121 sends the image to the printer 130 where it can be printed on media, such as a sticky receipt that can be affixed to the packaging associated with a customer order.

In another embodiment, the customer can authorize a new image or updated image of the customer to be managed by the visual integration manager 111. This can be achieved in a variety of manners, such as: by the customer using the customer device 140 to take the new image (photo—using a camera of the customer device 140) and push the new image to the visual integration manager 111 on the hospitality and loyalty server 100 (or pushing from the customer device 140 to the POS device 120), or by a clerk operating the POS device 120 using a camera 122 of the POS device 120 taking a new image (photo) of the customer and centrally storing with the visual integration manager 111 on the hospitality and loyalty server 110.

The various details and embodiments for these techniques, in view of the components within the architecture 100, are now presented with reference to the FIG. 1 within the context of the hospitality industry. Although, it is to be noted that other embodiments of the invention are not to be strictly tied to the hospitality industry as any industry, government agency, or organization can benefit from the teachings presented herein to improve operational efficiency and to improve an overall perceived customer experience.

The architecture 100 includes: a hospitality and loyalty server 110; a POS device 120; optionally, a printer 130; and, optionally, a customer device 140. The hospitality and loyalty server 110 includes a visual integration manager; the POS device 120 includes a POS customer identification manager 121, and, optionally, a camera 122. The customer device 140 includes a loyalty application (loyalty app 141). Each of these components will now be discussed in turn followed by some more detailed operational examples for the architecture 100 of the FIG. 1.

In an embodiment, the hospitality and loyalty server 110 can be a server 110 that is geographically remote and external to a processing environment associated with the POS device 120 (the server 110 connected in a Wide-Area Network (WAN) with the POS device 120). In some cases for this latter embodiment, the hospitality and loyalty server 110 can be geographically dispersed over multiple network connections but managed as one logical server 110, such as a cloud. In other situations, the hospitality and loyalty server 110 can be contained at one site on one or more machines associated with an enterprise that operates and/or manages the hospitality and loyalty server 110. It is also noted, that loyalty processing associated with the hospitality and loyalty server 110 can be processed on behalf of the hospitality and loyalty server 110 by a third-party provider over a network connection on one or more different servers.

In another case, the hospitality and loyalty server 110 is a local processing environment that is local to the POS device 120 (server 110 connected in a Local Area Network (LAN) with the POS device 120).

The hospitality and loyalty server 110 includes a visual integration manager 111. The visual integration manager 111 is one or more software module(s) that execute on processors of the hospitality and loyalty server 110.

During operation, the visual integration manager 111 manages photographs tied to customers, and provides those photographs to the POS customer identification manager 121 of the POS device 120 during transactions with customers for purposes of uniquely identifying customers and tying images of those customers to their orders throughout the entire lifecycle of those orders during the transactions.

The POS device 120 is a device operated by a clerk of an enterprise where a customer is visiting for some purposes, such as, in the present example being presented, a restaurant, a hotel, a fast-food establishment, a deli, a bar, a rental-car facility, an entertainment venue, and the like.

In an embodiment, the POS device 120 includes a display, memory, storage, one or more processors, and one or more input mechanisms for the clerk to input data regarding a transaction with the customer.

In another embodiment, the POS device 120 includes a display and one or more input mechanisms for the clerk to input data regarding the transaction. Here, the POS device 120 may have, may completely lack, or may have limited memory, storage, and processor(s). Essentially, the POS device 120 is a thin client connected to the hospitality and loyalty server 110 for memory, storage, and processing capabilities. It is noted that it may also be the case that the POS device 120 is a thin client that uses memory, storage, and processor(s) of a local server (not shown in the FIG. 1) where the local server is connected on behalf of the POS device 120 to the hospitality and loyalty server 110.

In one case, the POS device 120 is a standalone terminal that is operated by the clerk at an establishment of the enterprise to take or process a customer transaction, such as a food order in the present example (although any type of transaction can be processed via the POS device 120 on behalf of the customer).

In another case, the POS device 120 is a portable mobile device, such as a tablet, phone, laptop, or wearable processing device that the clerk carries around at the establishment.

The POS device 120 includes a POS customer identification manager 121. The POS customer identification manager 121 is one or more software modules that execute on processors of the POS device 120 (or on processors of the hospitality and loyalty service 110 when the POS device 120 is a thin client).

During operation of the POS customer identification manager 121, the POS customer identification manager 121 provides transaction details and/or customer details (loyalty card swipe information) for transactions of customers to the visual integration manager 111 of the hospitality and loyalty server 110. The visual integration manager 111 returns current photographs (images) for the customers to the POS customer identification manager 121. The POS customer identification manager 121 then links the photographs to the transactions of the customers as those transactions are processed by one or more personnel and/or devices throughout a facility where the transactions are being processed. In this way, the clerk and other personnel at the facility can visually tie the customers to their specific transactions (such as food orders but can be any types of retail transactions).

The POS device 120 can also include a camera 121. The camera can be used to capture a new (first image) of a customer or an updated image of the customer (to replace an existing image for that customer managed by the visual integration manager 121 of the hospitality and loyalty server 120). Of course, it is recognized that the customer may be required to consent to this new or updated photograph before the clerk operating the POS device 120 takes the photograph using the camera 122.

In an embodiment, the architecture 100 includes a printer 130 or printing peripheral device 130, such that any printed record for transactions of the customers can include images (photographs) of those customers. For example, and as mentioned above, a photograph of a customer can be printed on a receipt that is sticky media, which can be affixed to packaging associated with a transaction of the customer (such as bag, placemat (room service at a hotel), and the like. This permits personnel that handle the transaction with the receipt to readily visually identify a particular customer for which the transaction is associated.

According to an embodiment, the customer device 140 is any processing device operated by the customer. For example, the customer device 140 can be a tablet, a laptop, a desktop computer, a phone, or a wearable processing device. In an embodiment, the customer device 140 is a tablet that is affixed or located at a table or station of an enterprise where the transaction is being handled. In another case, the customer device 140 is any Self-Service Terminal (SST), such as a kiosk, operated by the customer at the enterprise.

The customer device 140 includes a loyalty app 141. The loyalty app 141 is a software module(s) that executes on one or more processors of the customer device 140. The loyalty app 141 is an enhancement of modification to an existing loyalty application for an enterprise that permits a customer to record and authorize an image of the customer to be noted with the customer's loyalty information and permits the enterprise to use that image for the purposes discussed herein. In other words, the loyalty app 141 (via customer input) interacts with the visual integration manager 111 and/or the POS customer identifier manager 121 to provide new (first) images and updated images of the customer for use by the enterprise during transactions with the customer. The communications can occur during a transaction (such as at the start, during the transaction, at the conclusion of a transaction) or can occur at times not related to the transaction, such as on initial loyalty sign up or modifications to existing loyalty information.

The architecture 100 may also include a kitchen production system 150. Here, this can include a variety of displays and or processing devices which may also be associated with the POS device 120.

During operation of the architecture 100, a customer initiates some transaction with an enterprise. The transaction can occur in person with a clerk operating the POS terminal or can occur in an automated manner that is initiated by the customer, such as via the customer device 140, as discussed above. The POS customer identifier manager 121 can provided the transaction details, including loyalty information for the customer, to the visual integration manager 111. The visual integration manager 111 returns typical customer details back to the POS device 120 and its systems (not shown in the FIG. 1) and provides a novel image for the customer (linked to the customer's loyalty account) for integration of the POS customer identifier manager 121 during processing of the transaction.

The above-described example assumes that the customer has supplied and authorized use of his/her image with the enterprise for transaction processing and has such an image on file (registered). In situations where this is not the case, the customer can be asked when the transaction is initiated to supply an image and authorize the use of the image. When the customer is initiating the transaction via the customer device 140, the loyalty app 141 can use used as an interface by the customer to supply the image and the authorization to either the visual integration manager 111 or the POS customer identifier manager 121. When the customer is initiating the transaction in person with a clerk operating the POS device 120, the customer can be asked to supply permission for the image and use of the image via an input mechanism at the POS device 120. The actual image can be taken via a camera 122 of the POS device 120. It is also noted that a transaction in person can also have the image supplied via the loyalty app 141 of the customer, such as when the clerk asks the customer to use the loyalty app 141 and a camera of the customer device 140 to upload the image and authorize its use.

Once the customer details are known and an image for the customer tied to the existing transaction of the customer at the enterprise, the POS customer identifier manager 121 can link the image to the transaction and push it through the enterprise site to the personnel and systems that handle the transaction processing. So, all personnel that handle the transaction during its lifecycle have the image, which is associated with the customer.

In an embodiment, a receipt tied to the transaction, which is printed to sticky media by the printer 130, includes the image. So, in a busy retail transaction, the staff of the retail facility can include a photograph of the customer on it. In this way, when the order (transaction) is ready, the staff can scan the customers waiting on completed orders make eye contact with a particular customer or locate where that customer is, and hand or walk the completed order to the that particular customer for delivery. Additionally, in a drive-thru example, the staff can ensure the order being handed to a customer that paid at a previous window of the drive-thru is the correct customer by visually inspecting the receipt with the image of the customer and the customer waiting to take the order. In smaller establishments, it may be that the customer is asked to take a seat and when the order having a copy of the receipt with the image is ready, other staff can deliver to the correct customer. This is even useful in hotels/restaurants when the staff that delivers the order to customer rooms/tables is different from the order takers/waiters (order takers can be automated online interfaces as discussed above) that took the orders to ensure properly delivery of food.

It is to be noted that the images do not have to be printed on receipts for transactions in all embodiments because enterprise staff responsible for delivery of the transactions can have mobile devices (such as tablets, laptops, or phones (which almost all will have). In these cases, the images for the customers can be presented on a display of the mobile device for the delivery staff to view. This may be particularly useful when delivery is made to a home by an agent of the enterprise, such as a carrier service permitting that carrier service to ensure delivery is being made to the proper person on behalf of the enterprise.

The images can also be pushed to a kitchen production system 150 where the image of the customer, and, perhaps, loyalty details for the customer (such as loyalty level and maybe with distinguishing visual attributes to readily identify a loyalty level of the customer) to the Kitchen production system 150 for viewing by staff on monitors (displays). In this way, customized and accurate service can be provided to the customer. This may be particularly beneficial with the drive-through service industry and other industries as well.

In some embodiments, images of family members associated with the customer can be integrated by the enterprise into the transaction processing described above as well. This scenario would permit a delivery agent to inspect multiple photographs to ensure proper delivery of a transaction is being made on behalf of the customer. The images can be of anyone authorized by the customer (and presumably separately authorized, as needed, by the subjects of the images). So, the technique does not have to be tied to what is considered legal family members, if properly authorized by the relevant parties.

It is also noted that the images are not just useful at the conclusion of a transaction. For example, it may be that some staff of the enterprise has a question regarding the transaction or wants to report some issue that is associated with completing the transaction. In this case, the image can be used in printed form or on a presentation within a display of a mobile device to locate the customer tied to the transaction and ask the question or communicate the issue.

Moreover, as noted previously, the transaction does not have to be tied in each instance to the hospitality industry as all industries can benefit from the teachings provided herein. For example, anyone that has visited a chaotic cell phone carrier store knows that often the customer has to take a number or mill about the store for what seems to be forever. For carrier staff to tie a request for service (type of transaction and one that may not even occur) with an image of a customer would be a tremendous help to both the staff and the customer (who may be wondering around the store waiting to be served or sitting in one location with many others waiting for service).

Moreover, the images of the customers tied to transactions can be broadcasted to systems of the enterprise or displays of multiple devices. So, enterprise staff can readily identify customers in the facility that awaits specific orders or so some enterprise staff can locate them and provide updates on their orders.

In fact, a myriad of uses can be achieved with the teachings herein where a customer image is tied to enterprise transaction processing.

Figure 2:
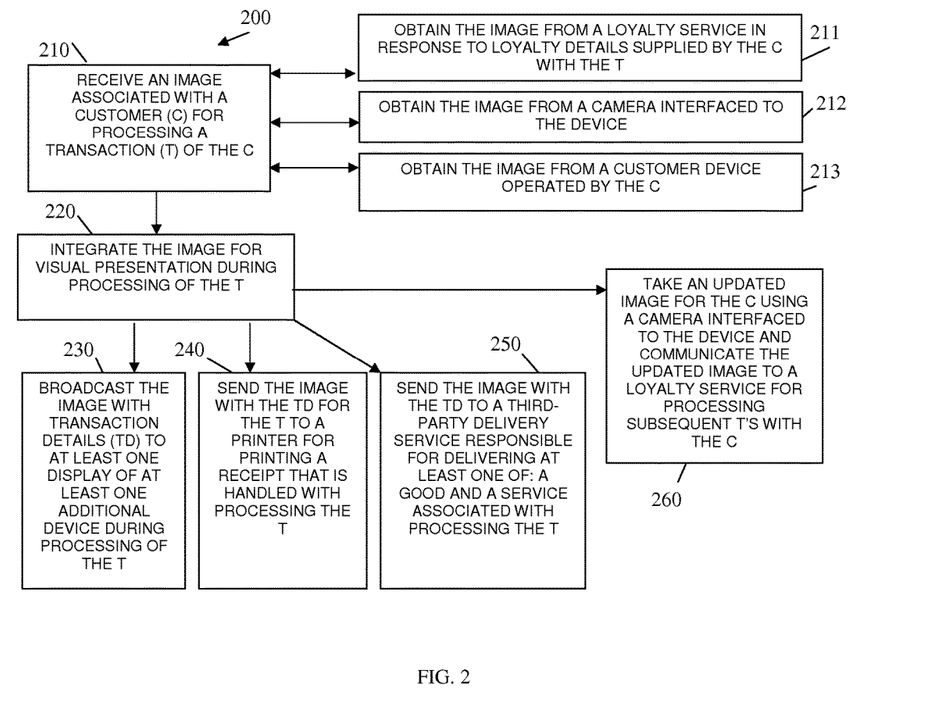
FIG. 2 is a diagram of a method for visual customer identification, according to an example embodiment.
Figure 3:
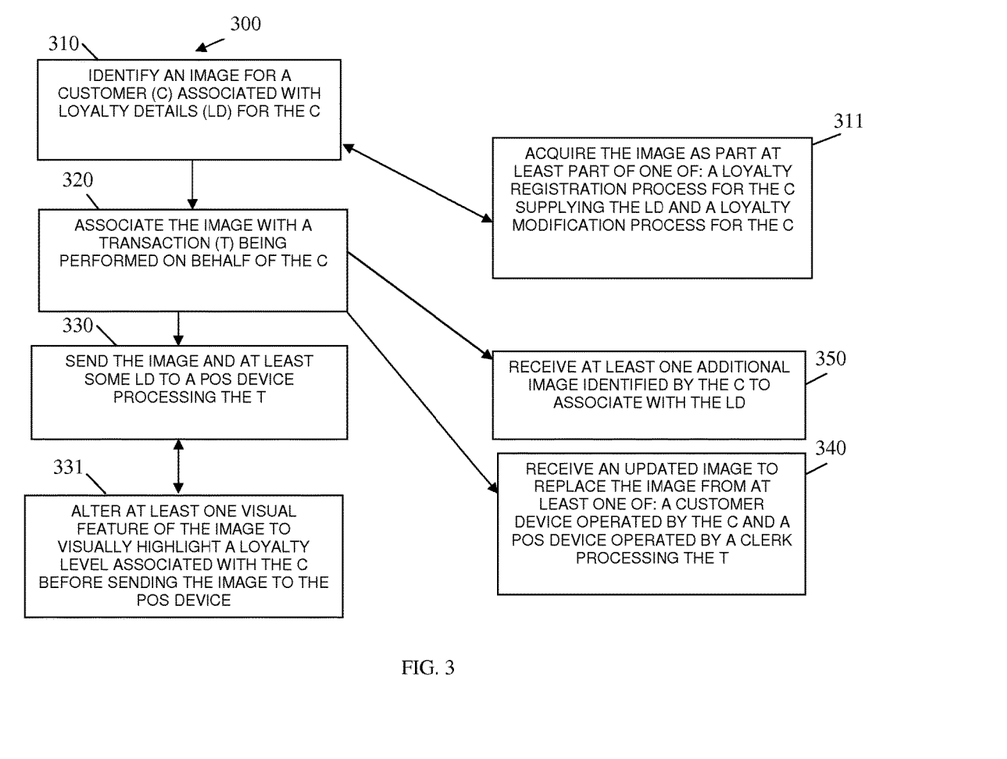
FIG. 3 is a diagram of another method for visual customer identification, according to an example embodiment.
Figure 4:
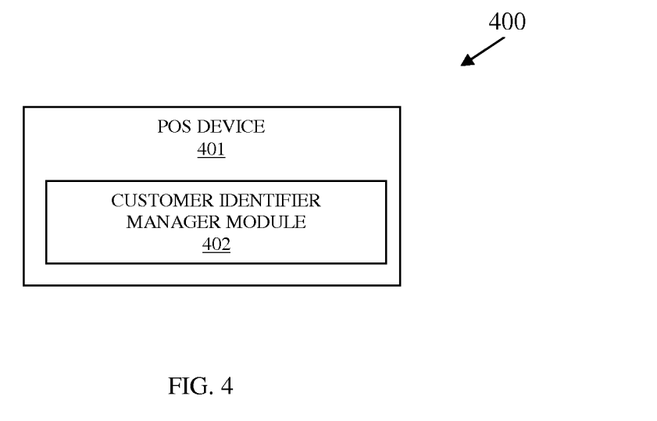
FIG. 4 is a diagram of a customer visual identification system, according to an example embodiment.

Some additional embodiments and details and in some cases enhanced perspective of what has already been described are now presented with the discussion of the FIGS. 2-4.

FIG. 2 is a diagram of a method 200 for visual customer identification, according to an example embodiment. The software module(s) that implements the method 200 is referred to as a "POS customer image integrator." The POS customer image integrator is implemented as executable instructions programmed and residing within memory and/or a non-transitory computer-readable (processor-readable) storage medium and executed by one or more processors of a device. The processors of the device that executes the POS customer image integrator are specifically configured and programmed to process the POS customer image integrator. The POS customer image integrator has access to one or more networks during its processing. The networks can be wired, wireless, or a combination of wired and wireless.

In an embodiment, the device that executes the POS customer image integrator is a POS device, such as POS device 120 presented above with respect to architecture 100 of the FIG. 1. The POS device 120 can be a standalone or portable mobile device. Moreover, the POS device 120 can have its own memory, storage, and processors or can be a thin client that utilizes a local server or the hospitality and loyalty server 110 of the FIG. 1 for memory, storage, and processing.

Moreover, in an embodiment, the POS customer image integrator is the POS customer identifier manager 121 of the FIG. 1.

At 210, the POS customer image integrator receives an image associated with a customer for processing a transaction of the customer.

In an embodiment, the image is a photograph of the customer.

In another case, the image is any graphic or any image (animated or non animated) identified in loyalty details by the customer to use with transaction processing. With this embodiment, the image can be used by the customer for security purposes to uniquely identify the customer or can be used in situation where the customer wants to preserve some anonymity associated with transaction processing but would still like to benefit from some of the aspects taught herein and below.

The image can be received via a variety of mechanisms.

For example, at 211, the POS customer image integrator obtains the image from a loyalty service in response to loyalty details supplied by the customer. This was discussed above with respect to the discussion of the FIG. 1. The loyalty details can be supplied by the customer when the transaction is initiated at a POS device executing the POS customer image integrator, such as via a loyalty card swipe that is then sent to the loyalty service to receive the loyalty details and the image back from the loyalty service. In a similar processing scenario, a clerk interacting with the POS device, via a POS interface, acquires a phone number or some other identifying information from the customer that is entered into the POS interface and sent to the loyalty service to obtain the loyalty details and the image. In another embodiment, the customer initiates the transaction independent of the POS device, such as via a customer device (desktop computer, mobile device, kiosk, and the like), and the POS customer image integrator receives a pushed transaction with some loyalty details and the image from the loyalty service.

In another embodiment, at 212, the POS customer image integrator obtains the image from a camera interfaced to the device that executes the POS customer image integrator (such as a POS device). Here, a clerk can ask the customer if it is permissible to associate an image of the customer with the customer's loyalty account and with the transaction. It may also be the customer lacks any loyalty account, so the image acquired in this situation may be a onetime situation.

In still another case, at 213, the POS customer image integrator obtains the image from a customer device operated by the customer. So, the customer may use a loyalty app, such as loyalty app 141 of the FIG. 1, to send an existing image on his/her mobile device or to send an image that the customer takes using a camera of his/her mobile device and then send that image to the POS customer image integrator by establishing a wireless connection to the POS device executing the POS customer image integrator to supply the image. It may also be the case that the customer is initiating the transaction remote from the POS device, such as via a computer (such as in a hotel room or at home (ordering takeout food or some other good), etc.), and the customer uploads the image to associate with the transaction from that device.

At 220, the POS customer image integrator integrates the image for visual processing of the transaction. That is, the image is available for viewing or is forcibly presented (on display(s) or print media) during each step of the transaction processing. This permits the image to be viewed or accessed for viewing during the entire lifecycle of the transaction processing for customer identification and association.

According to an embodiment, at 230, the POS customer image integrator broadcasts the image with transaction details for the transaction to at least one display of at least one device during the transaction processing. In other words, and in some instances, a retail establishment can have all monitors (including mobile device displays) situated or available within a facility present the image of the customer with the transaction details. It is noted that these monitors can include all other existing customers with their images presented in list-type viewing mode within screen shots of the monitors. So, if a particular customer is not having his/her transaction processed or needs assistance of a supervisor such a situation can be handled by someone appropriate in a timely fashion, and the servicing personnel can visually identify the customer that needs assistance and/or a transaction tied to that customer that needs the servicing personnel's assistance.

In an embodiment, at 240, the POS customer image integrator sends the image with transaction details for the transaction to a printer for printing a receipt that is handled with processing the transaction. In an embodiment, the receipt is on sticky media that has at least a portion of a read side that includes adhesive that can be affixed to packaging or any other item associated with processing the transaction. This is particularly beneficial in food and beverage establishments where customers do not immediately receive their goods after an order is taken from them and multiple staff of the establishments handles the goods before it is given to the customers.

According to an embodiment, at 250, the POS customer image integrator send the image with the transaction details to a third-party delivery service responsible for delivering a good and/or a service associated with processing the service.

Here, the image can be used by systems of the third-party delivery service to verify proper delivery takes place. In fact, in some instances it can be used in place of signature requirements or in connection with signature requirements. Moreover, the delivery personnel can take a photograph of the receiving individual for record verification.

In an embodiment, at 260, the POS customer image integrator takes an updated image for the customer using a camera interfaced to the device that executes the POS customer image integrator. That updated image can then be updated to a loyalty service for processing subsequent transactions with the customer. This situation was described above with reference to the FIG. 1.

One now fully appreciates how an image associated with a customer can be integrated for visual inspection into transaction processing for a transaction of a customer to improve enterprise operating efficiency, improve security, and improve the experience of the customer with the enterprise.

In fact, other uses can benefit as well. For example, the image can be used by a clerk at the POS device to verify a credit card supplied with a name on it comports with the image presented on a display of the POS device and a name tied to a loyalty account of the customer, via the processing of the POS customer image integrator.

FIG. 3 is a diagram of another method 300 for visual customer identification, according to an example embodiment. The software module(s) that implements the method 300 is referred to as a "server customer image integrator." The server customer image integrator is implemented as executable instructions programmed and residing within memory and/or a non-transitory computer-readable (processor-readable) storage medium and executed by one or more processors of a server device. The processors of the server device that executes the server customer image integrator are specifically configured and programmed to process the server customer image integrator. The server customer image integrator has access to one or more networks during its processing. The networks can be wired, wireless, or a combination of wired and wireless.

In an embodiment, the server device that executes the server customer image integrator, such as server 130 presented above with respect to architecture 100 of the FIG. 1. The service device can be local to the processing environment of the POS customer image integrator of the FIG. 1 or can be remote to the local processing environment of the POS customer image integrator of the FIG. 1 (in some cases the server device is a cloud processing environment including multiple devices logically assembled to represent a single server device).

In an embodiment, the server customer image integrator is the visual integration manager 111 of the FIG. 1.

At 310, the server customer image integrator identifies an image for a customer that is associated with loyalty details for the customer. In an embodiment, the server customer image integrator obtains the image based on a portion of the loyalty details supplied with a transaction that is directly initiated by the customer or indirectly initiated by the customer, via a clerk at a POS device. The image can be identified in other manners as well.

For example, at 311, the server customer image integrator acquires the image as part of a loyalty registration process for the customer where the customer supplies the loyalty details (either via a customer device or via a clerk that enters the loyalty details at a POS device on the direction of the customer). The server customer image integrator can also acquire the image as part of a loyalty modification process for the customer, such as where the customer is directly updating the image to the loyalty details or a clerk is updating the image on behalf of the customer at a POS device.

At 320, the server customer image integrator associates the image with a transaction being performed on behalf of the customer. That is, the transaction can be initiated by the customer, via a customer device, and then processed or facilitated for processing by a POS device. Alternatively, the customer can initiate the transaction at a POS terminal having a clerk the processes or facilitates the processing of the transaction for the customer.

According to an embodiment, at 330, the server customer image integrator sends the image and at least some of the loyalty details to a POS device processing the transaction. This can be a push from the server customer image integrator to the POS device, such as when the customer initiates the transaction at a device that is independent of the POS device (a customer device, which can in some instances be an enterprise kiosk that the customer operates).

Continuing with the embodiment of 330 and in another case of 330 at 331, the server customer image integrator alters at least one visual feature of the image to visually highlight a loyalty level associated with the customer before sending the image to the POS device. This can be useful in enterprises where loyal customers or customers that spend a lot of money with the enterprise are to receive superior service from enterprise personnel. Any visual feature can be added, such as color coded loyalty levels, loyalty symbols injected into the image, and others.

In an embodiment, at 340, the server customer image integrator receives an updated image to replace the image from a customer operated device (can be an enterprise kiosk, a mobile device, a desktop computer, a wearable processing device worn by the customer, and the like). In another instance of 340, the server customer image integrator receives the updated image from a POS device operated by a clerk of an enterprise.

According to one situation, at 350, the server customer image integrator receives at least one additional image identified by the customer to associate with the loyalty details. This situation was described above with respect to the discussion of the FIG. 1 and may, in some instances, require permission to be recorded by the individual(s) that are the subject of the additional image(s). So, as an example, a spouse's image for the customer can be associated with the customer's loyalty account along with a name for that spouse. This can provide beneficial processing situations, such as being able to address the spouse by name when the customer and spouse are within the enterprise during the transaction and other situations discussed above with the FIG. 1.

FIG. 4 is a diagram of a customer visual identification system 400, according to an example embodiment. The customer visual identification system 400 is programmed and resides within memory and/or a non-transitory computer-readable medium and execute on one or more processors of one or more devices. The customer visual identification system 400 has access and can communicate over one or more networks; and the networks can be wired, wireless, or a combination of wired and wireless.

The customer visual identification system 400 includes a POS device 401 having a POS customer identifier manager module 402 programmed within memory and/or a non-transitory computer-readable storage media as executable instructions of the SST 400.

In an embodiment, the POS device 401 is a standalone POS terminal.

In an embodiment, the POS device 401 is a portable mobile device.

In another embodiment, the POS device 401 is a thin client.

According to an embodiment, the POS device 401 is the POS device 120 of the FIG. 1 and the POS customer identifier manager module 402 is the POS customer identifier manager 121 of the FIG. 1.

The POS customer identifier manager 402 is configured to associate an image of a customer with a transaction being processed for that customer. Further, the POS customer identifier manager 402 is configured to integrate the image throughout a lifecycle for processing the transaction.

In an embodiment, the POS customer identifier manager 402 is further configured to direct a printer to print the image on a transaction receipt associated with the transaction. According to one case, the receipt is rendered on sticky media having a side with at least some adhesive to affix the media to an item associated with the transaction.

According to an embodiment, the POS customer identifier manager 402 is further configured to broadcast the image with transaction details for the transaction to at least one display of at least one additional device. This situation was described at length above with respect to the FIGS. 1-2.

One now appreciates how an image of a customer can be integrated into customer transaction processing (before, at the start of, during, and/or the conclusion of) to improve enterprise operational efficiency and to improve the customer's experience for the transaction with the enterprise.

It should be appreciated that where software is described in a particular form (such as a component or module) this is merely to aid understanding and is not intended to limit how software that implements those functions may be architected or structured. For example, modules 131 and 134 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving, by a device that is a Point-Of-Sale (POS) terminal, an image of a customer during processing of a transaction with the customer and using the image during processing of the transaction;
    integrating, by the device, the image for visual presentation on one or more displays of multiple devices during processing of the transaction by forcibly presenting the image on the displays of the multiple devices during the transaction;
    printing, by a printer, the image on a sticky media receipt for affixing to an item associated with the transaction; and
    broadcasting, by the device, the image with at least one transaction detail for the transaction to multiple ones of the one or more displays associated with the multiple devices during processing of the transaction, wherein broadcasting further includes broadcasting other images associated with other customers engaged in other transactions to the multiple ones of the one or more displays in a list-type viewing mode within screen shots of the multiple ones of the one or more displays.

2. The method of claim 1 further comprising, sending, via the device, the image with at least one transaction detail to a third-party delivery service responsible for delivering at least one of: a good and a service associated with processing the transaction.

3. The method of claim 1 further comprising, receiving, taking, via the device, an updated image for the customer using a camera interfaced to the device and communicating the updated image to a loyalty service for processing at least one subsequent transaction with the customer.

4. The method of claim 1 wherein receiving further includes obtaining the image from a loyalty service in response to at least one loyalty detail supplied by the customer with the transaction.

5. The method of claim 1, wherein receiving further includes obtaining the image from a camera interfaced to the device.

6. The method of claim 1, wherein receiving further includes obtaining the image from a customer device operated by the customer.

7. A method, comprising:
    identifying, via a server, an image for a customer associated with at least one loyalty detail for the customer;
    associating, via the server, the image with a transaction being performed on behalf of the customer and broadcasting the image to multiple displays of multiple devices associated with the transaction by forcibly presenting the image on the multiple displays of the multiple devices during the transaction, wherein broadcasting further includes providing other images associated with other customers engaged in other transactions to the multiple displays in a list-type viewing mode within screen shots of the multiple displays; and
    providing, via the server, the image to a printer for printing the image on a receipt that is sticky media and affixed to an item of the transaction.

8. The method of claim 7 further comprising, sending, via the server, the image and at least one or more additional loyalty details to a Point-Of-Sale (POS) device processing the transaction.

9. The method of claim 8, wherein sending further includes altering at least one visual feature of the image to visually highlight a loyalty level associated with the customer before sending the image to the POS device.

10. The method of claim 7 further comprising, receiving, via the server, an updated image to replace the image from at least one of: a customer device operated by the customer and a Point-Of-Sale (POS) device operated by clerk processing the transaction.

11. The method of claim 7 further comprising, receiving, via the server, at least one additional image identified by the customer to associate with the at least one loyalty detail.

12. The method of claim 7 wherein identifying further includes acquiring the image as a part of one of: a loyalty registration process for the customer supplying the at least one loyalty detail and loyalty modification process for the customer.

13. A system, comprising:
a Point-Of-Sale (POS) device configured to facilitate execution of a POS customer identifier module; and
wherein the POS customer identifier module is configured to associate an image of a customer with a transaction being processed for the customer and further configured to integrate the image throughout a lifecycle for processing the transaction including forcibly presenting, through a broadcast, the image on multiple displays of multiple devices during the lifecycle of the transaction, and broadcast other images associated with other customers engaged in other transactions to the multiple displays in a list-type viewing mode within screen shots of the multiple displays, and wherein the POS customer identifier module is further configured to provide the image to a printer for printing on a sticky media receipt that is affixed to an item associated with the transaction.

14. The system of claim 13, wherein the POS device is at least one of: a standalone POS terminal and a portable mobile device.

15. The system of claim 13, wherein POS device is a thin client.

* * * * *